W. HEBERN AND A. J. GRAY.
TRANSMISSION LOCK.
APPLICATION FILED JAN. 7, 1920.
1,397,420.
Patented Nov. 15, 1921.
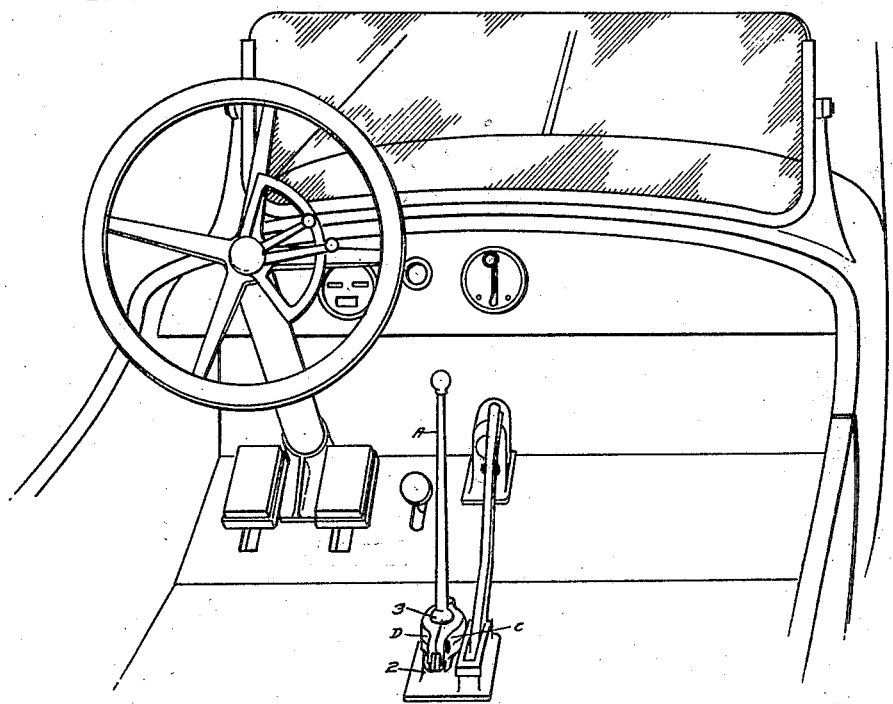
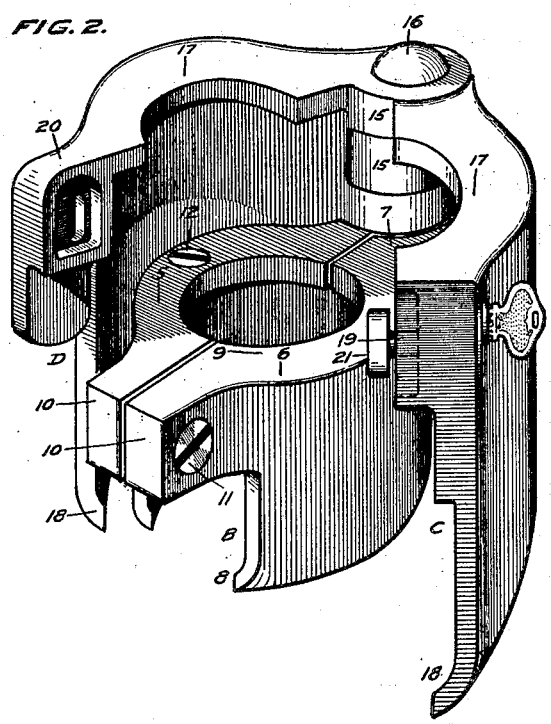
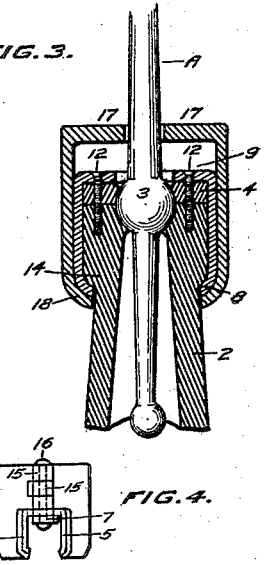
INVENTOR
WILLIAM HEBERN.
ALBERT J. GRAY.
BY *Chas. E. Townsend*
ATTORNEY.

UNITED STATES PATENT OFFICE.

WILLIAM HEBERN AND ALBERT J. GRAY, OF OAKLAND, CALIFORNIA, ASSIGNORS TO SECURITY AUTO LOCK CO., A COPARTNERSHIP CONSISTING OF ALBERT J. GRAY, WILLIAM HEBERN, AND DAVID GUILD, JR.

TRANSMISSION-LOCK.

1,397,420.     Specification of Letters Patent.     Patented Nov. 15, 1921.

Application filed January 7, 1920. Serial No. 349,956.

*To all whom it may concern:*

Be it known that we, WILLIAM HEBERN and ALBERT J. GRAY, citizens of the United States, residing at Oakland, in the county of Alameda and State of California, have invented new and useful Improvements in Transmission-Locks, of which the following is a specification.

This invention relates to a transmission lock and especially to means for locking the gear shift lever on an automobile when in neutral position.

One of the objects of the present invention is to provide a simple and substantial locking mechanism which is adapted to be permanently attached to the extension on the upper half of the transmission case in which the gear shift lever is universally journaled and to so construct and position the lock that it will embrace the gear shift lever and lock the same against movement when in neutral position.

Another object of the invention is to provide a lock of the character described which consists of a pair of hingedly connected base sections and a pair of hingedly connected locking sections; further to provide means for permanently securing the base sections to the transmission case and to construct the hingedly connected locking sections so that they will entirely inclose the base sections and secure these against removal while simultaneously locking the gear shift lever against movement.

Further objects will hereinafter appear.

The invention consists of the parts and the construction, combination and arrangement of parts as hereinafter more fully described and claimed, having reference to the accompanying drawings, in which—

Figure 1 is a perspective view of a portion of an automobile showing the application of the invention.

Fig. 2 is a perspective view of the lock.

Fig. 3 is a central vertical section of the extension on the transmission case in which the gear shift lever is journaled.

Fig. 4 is a rear view of the lock showing the hinged structure whereby the several parts of the lock are connected.

Referring to the drawings in detail, A indicates the gear shift lever of an automobile and 2 the extension on the transmission case in which the gear shift lever is supported and journaled. The majority of transmissions in use today employ a universally mounted gear shift lever such as here shown, that is the lever is swung about and supported by a ball or socket member 3 supported in the upper end of the housing 2 and secured therein by means of a cover plate 4.

There has up to the present time been constructed several varieties of locks for securing the gear shift lever against movement when in neutral position. These locks, as far as we are aware, have all been removable and are therefore more or less bothersome, due to the fact that they have to be removed or applied, as the case may be, and often become mislaid when removed. The main purpose of the present invention is to provide a lock capable of securing the gear shift lever in neutral position which is adapted to be permanently attached to the housing in which the gear shift lever is journaled, thus overcoming the objections above referred to, at least avoiding the misplacing or loss when not in use.

The lock, forming the subject matter of the present invention, consists of a base section B and a pair of hingedly connected locking sections C and D. The base section is provided for the support of the locking sections C and D and also for the purpose of forming a permanent attachment with relation to the housing 2. The base section B consists of a cylindrical shell split into two sections 5 and 6, which are hingedly connected as at 7. Formed on the lower edge of the cylindrical shell is an inturned annular flange 8 and formed on the upper portion thereof is an inturned flange 9. Formed on the front of the cylindrical shell, in alinement with the hinge lugs 7, and directly opposite the same, are a pair of projecting lugs 10 which are perforated and threaded for the reception of a clamping bolt or screw 11. The sections 5 and 6 of the base B are placed about the upper end of the housing 2 as shown in Fig. 3 and they are secured thereto when the sections are brought together by means of the screw 11, or by means of the screws 12. The base section is permanently secured in this manner and is held against endwise movement on the casing 2, first, by the inturned annular flange 9, and secondly, by the lower annular inturned flange 8. The flange 8 passes under an annular shoulder 14 formed on the housing 2. This shoulder prevents upward movement of the base section and the flange 9 downward movement. The screw 11 is the only securing means required when an annular shoulder such as indicated at 14 is formed on the housing. It however happens that certain makes of cars are not constructed exactly as shown in Fig. 3, and that the shoulder 14 is eliminated. In that case we employ the securing screws 12.

The locking sections C and D are also shaped to form a cylindrical shell which is adapted to entirely inclose the base section B and the lower portion of the gear shift lever A. The sections C and D are hingedly connected by lugs 15 and a pintle 16, said pintle extending through the several lugs 15 and 7 formed on the base and the locking sections and thereby permanently connecting the same. The locking sections are also provided with an upper annular shoulder 17 and a lower annular shoulder 18, and they are further provided with a key actuated lock 19 and a keeper 20, the keeper being formed on the section D and the lock proper on the section C. Any suitable form of key actuated lock may be employed, but preferably a cylinder type of lock, on the outer end of which may be mounted a latch 21. This latch is turned by means of a key and cylinder and enters the keeper 20 when the sections C and D are brought together. Turning movement of the latch by means of the key when in this position will place it crosswise of the pocket formed within the keeper 20 and the sections are thus locked and the key removed.

By referring to Figs. 2 and 3, it can be seen that the locking sections C and D are attached to the base member B by means of the pintle 16 and that they are adapted to be opened or closed with relation to each other about said pintle. Again, it can be seen that the annular flange 17 is of such diameter that it will tightly embrace the gear shift lever A and thereby prevent movement of the same when in neutral position. The locking sections C and D perform two important functions, first that of securing the gear shift lever against movement when the sections are locked, and secondly, that of inclosing the base section and the screws by which the base section is secured to the housing 2. This is exceedingly important as it will prevent a thief or any other unauthorized person from tampering with or removing the lock. In fact it will be practically impossible to remove the same without a duplicate key or without going to considerable trouble, such as cutting away the pintle or a sufficient portion of the sections C and D to permit removal of the screws 11 or 12. An attempt of this nature would of course be rather hazardous and would probably attract sufficient attention to defeat any attempt of this character.

Another important feature of the present invention is the fact that the lock is permanently attached to the housing 2 and it cannot therefore be removed or misplaced when not in use. When it is desired to use the car it is only necessary to insert the key and release the lock. This permits the sections C and D to be swung outwardly about the pintle 16 to such an extent that the gear shift lever may be freely moved as desired. Again if it is desired to lock the car when leaving the same, it is only necessary to place the lever A in neutral and to close the sections C and D and lock them with the key 19. This can be accomplished with comparatively little effort and bother on the part of the driver as the sections C and D are always in a position where they can be quickly and readily locked or released.

While certain features of the present lock are more or less specific in construction and design, we wish it understood that various changes in details and design may be resorted to within the scope of the appended claims similarly that the materials and finish of the several parts employed may be such as the experience and judgment of the manufacturer may dictate or varying conditions may demand.

Having thus described our invention, what we claim and desire to secure by Letters Patent is—

1. The combination with the gear shift lever on an automobile and the casing in which the lever is supported, of a base member adapted to be secured to the casing, a pair of locking members hingedly secured to the base member and adapted to entirely inclose and lock the base member against removal and the gear shift lever against movement, and means for locking or releasing the locking members against movement about their hinged connection.

2. The combination with the gear shift lever on an automobile and the casing in which the lever is supported, of a base member adapted to inclose the upper end of the casing, said base member consisting of two separable sections means for securing said sections with relation to each other and with relation to the casing, and a pair of locking members carried by the base member adapted to embrace the gear shift lever and lock it against movement, and also adapted to entirely inclose the base member and cover the means whereby the base sections are secured.

3. The combination with the gear shift lever on an automobile and the casing in which the lever is supported, of a base member adapted to inclose the upper end of the casing, said base member consisting of two hingedly connected sections means for seing said sections with relation to each other and with relation to the casing, a pair of semi-cylindrical shaped locking members hingedly secured to the base member, said semi-cylindrical locking members adapted to entirely inclose the base section and the means whereby it is secured and also adapted to lock the gear shift lever against movement, and means for locking said locking sections with relation to each other.

4. The combination with the gear shift lever on an automobile and the casing in which the lever is supported, of a base member adapted to inclose the upper end of the casing, means for securing said base member with relation to the casing, a pair of semi-cylindrical shaped locking members hingedly secured to the base member, said locking members adapted to entirely inclose the base section and the means whereby it is secured and also adapted to lock the gear shift lever against movement, and key actuated means for locking the locking members with relation to each other.

5. The combination with the gear shift lever on an automobile and the casing in which the lever is supported, of a cylindrical shaped base section adapted to inclose the upper end of the casing, said cylindrical base section being centrally and vertically divided, the sections at one end being hingedly connected, and at the opposite end provided with lugs for the reception of a screw, means for locking the base member against vertical movement on the casing, a pair of locking members hingedly secured to the base section, said locking members when closed forming a cylindrical shell which entirely incloses the base member and surrounds the gear shift lever to secure the same against movement, a key actuated lock carried by one of the locking sections, a latch adapted to be turned by said key actuated lock, and a keeper formed on the opposite locking section for the reception of the latch.

6. The combination with the gear shift lever on an automobile and the casing in which the lever is supported, of a cylindrical shaped base section adapted to inclose the upper end of the casing, said cylindrical base section being centrally and vertically divided, the sections at one end being hingedly connected, and at the opposite end provided with lugs for the reception of a screw, means for locking the base member against vertical movement on the casing, a pair of locking members hingedly secured to the base section, said locking members when closed forming a cylindrical shell which entirely incloses the base member and surrounds the gear shift lever to secure the same against movement, a key actuated lock carried by one of the locking sections, a latch adapted to be turned by said key actuated lock, a keeper formed on the opposite locking section for the reception of the latch, and means on the locking sections for securing the same against vertical movement on the base member and the casing.

In testimony whereof we have hereunto set our hands in the presence of two subscribing witnesses.

WILLIAM HEBERN.
ALBERT J. GRAY.

Witnesses.
W. W. HALEY,
W. E. EWING.